(12) United States Patent
Bobier

(10) Patent No.: US 8,060,118 B2
(45) Date of Patent: Nov. 15, 2011

(54) MOBILE HANDSET INFORMATION STREAM

(75) Inventor: Joseph A. Bobier, Sunrise, FL (US)

(73) Assignee: XG Technology, Inc., Sarasota, FL (US)

( * ) Notice: Subject to any disclaimer, the term of this patent is extended or adjusted under 35 U.S.C. 154(b) by 568 days.

(21) Appl. No.: 12/150,423

(22) Filed: Apr. 28, 2008

(65) Prior Publication Data

US 2008/0280628 A1 Nov. 13, 2008

Related U.S. Application Data

(60) Provisional application No. 60/928,583, filed on May 10, 2007.

(51) Int. Cl.
*H04M 1/00* (2006.01)

(52) U.S. Cl. ............... 455/456.3; 455/466; 370/395.61; 370/345

(58) Field of Classification Search .................. 370/349, 370/338, 395, 345, 329, 331, 310; 455/450, 455/436, 566, 456, 426.1, 515; 375/133, 375/E1.033; 709/246

See application file for complete search history.

(56) References Cited

U.S. PATENT DOCUMENTS

| | | | |
|---|---|---|---|
| 6,028,851 A * | 2/2000 | Persson et al. ................. | 370/329 |
| 2002/0002624 A1 * | 1/2002 | Hausmann et al. ............ | 709/246 |
| 2003/0083109 A1 * | 5/2003 | King et al. ..................... | 455/566 |
| 2004/0203959 A1 * | 10/2004 | Coombes ........................ | 455/466 |
| 2004/0246977 A1 * | 12/2004 | Dove et al. ............... | 370/395.61 |
| 2005/0100120 A1 * | 5/2005 | Barton et al. .................. | 375/347 |
| 2007/0016921 A1 * | 1/2007 | Levi et al. ........................ | 725/35 |
| 2007/0073805 A1 * | 3/2007 | Jorgensen ..................... | 709/203 |
| 2007/0094691 A1 * | 4/2007 | Gazdzinski ..................... | 725/62 |
| 2007/0211686 A1 * | 9/2007 | Belcea et al. .................. | 370/345 |

* cited by examiner

*Primary Examiner* — Nick Corsaro
*Assistant Examiner* — Mahendra Patel
(74) *Attorney, Agent, or Firm* — Dennis L. Cook, Esq.

(57) ABSTRACT

A system and method which allows for a more direct form of presenting useful information to a mobile handset user is disclosed. More specifically a method to dedicate a transmission period of the MAC protocol when certain pre-formatted information is transmitted to all users on a network.

5 Claims, 1 Drawing Sheet xMax Super Frame Structure xMax Super Frame Structure

MOBILE HANDSET INFORMATION STREAM

CROSS-REFERENCE TO RELATED APPLICATION

The present application claims the benefit of previously filed co-pending Provisional Patent Application Ser. No. 60/928,583 filed May 10, 2007.

FIELD OF INVENTION

This invention relates to a system which allows for a more direct form of presenting useful information to a mobile handset user, and more specifically is a method to dedicate a transmission period of the MAC protocol when certain pre-formatted information is transmitted to all users on a network.

BACKGROUND OF INVENTION

Old media got left behind in the race to go online, in part because the prospects for advertising, traditionally the major revenue generator for newspapers, magazines and television, seemed unclear on the Internet. Then online advertising took off, and old media are still playing catch-up. Now, with the next iteration of the Internet, the mobile Web, spreading around the world, publishers and other content providers are trying to keep up, lest they get in late on another advertising bonanza.

A survey, conducted by TNS Media and Entertainment in the United States, Britain, France, Germany, Italy and Spain, found that 76 percent of cell phone owners in those countries now have access to the Web from mobile devices. The researchers, who polled about 1,000 people in each country, found that more than a third of those with mobile Web access used such services. The Web-using population ranged from 34 percent in France to 54 percent in Britain. Even if these estimates are not quite right, mobile marketing could be a big thing, simply because the numbers are enormous. Some oft-repeated measures: Around one billion mobile phones will be sold around the world this year. Globally, there are more cell phones than PCs.

In advertising terms, however, the mobile phone remains very much the third screen, behind television and the PC. Outside of Asia, where mobile advertising has grown rapidly in markets like Japan, activity is still dominated by "text and response" campaigns that ask users to send text messages for more information on a product, or to enter a contest, for example.

Thus mobile phone handsets do already make information such as news, sports, weather and other information available. Usually this is done by virtue of an integrated web browser. Sometimes the service provider will provide special web pages, formatted especially for viewing on the small handset screen. The phone is usually programmed to view these specially formatted web pages first, by defaulting to a mobile home page with menu choices for each category. This requires the user to select and download desired information. This is often a tedious and slow process and it is one reason many users have been reluctant to take advantage of data services on handsets.

The following disclosure will describe a method of making such information available to all users simultaneously and without requiring user interaction of web pages because the information is pre-loaded to each user as part of the over the air interface or MAC layer.

BRIEF SUMMARY OF THE INVENTION

Communicating with multiple wireless devices requires a protocol. This is referred to as a Media Access Control or MAC protocol, also called a MAC layer. The protocol is used to control the flow of information between the network and multiple users or devices, so that such coordinated communication is organized and error free. The object of this invention is to dedicate a transmission period of the MAC protocol when certain pre-formatted information is transmitted to all users. The receiving device, generally a handset, will receive the transmitted page or pages of information and display them as screens of relevant information.

It is therefore an object of the invention to supply increased functionality to a mobile handset allowing real time viewing of useful information to all users simultaneously without requiring user interaction with web pages.

BRIEF DESCRIPTION OF DRAWINGS

For a fuller understanding of the nature and objects of the invention, reference should be made to the following detailed description, taken in connection with the accompanying drawings, in which.

DESCRIPTION OF PREFERRED EMBODIMENT

Figure 1:
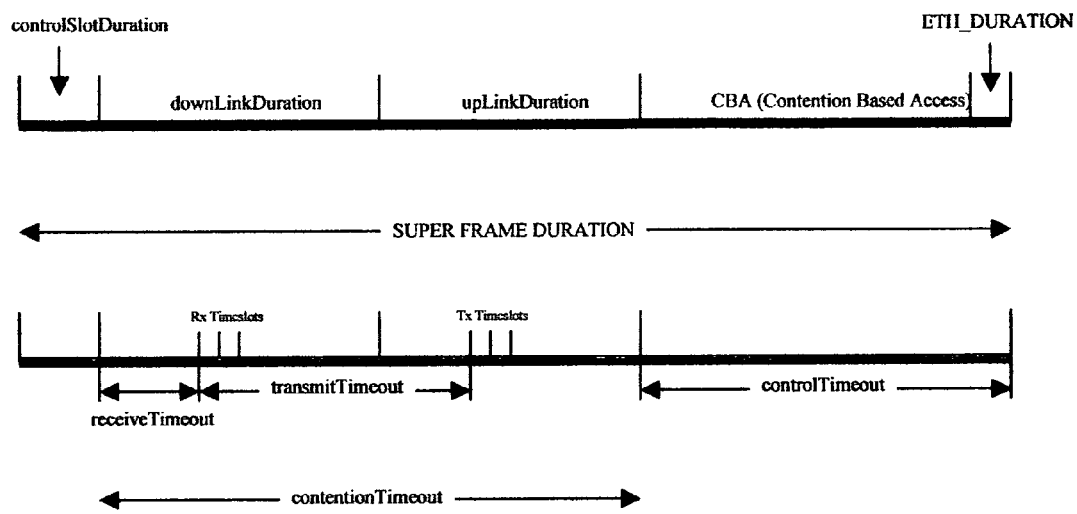
FIG. 1: A representation of a MAC protocol super frame.

Communicating with multiple wireless devices requires a protocol. This is referred to as a Multiple Access Control or MAC protocol, also called a MAC layer. The protocol is used to control the flow of information between the network and multiple users or devices so that such coordinated communication is organized and error free.

The method described in this disclosure dedicates a transmission period of the MAC protocol when certain pre-formatted information is transmitted to all users. The receiving device, generally a handset, will receive the transmitted page or pages of information and display them as screens of relevant information.

For instance, the network will transmit a page of information that describes the weather forecast. The weather forecast is received by all user devices and is displayed when the device is serving no other purpose; for example, when it is idle. That page will be replaced in a few seconds by the next page, which might be local news headlines. In turn, that page might be replaced by national news headlines, then in turn by international headlines. At least one of the information pages will be dedicated to paid advertising. The user will at some time see the paid advertising. It could, for instance, be an advertisement for a local pizza shop with a special offer just for mobile users. While the advertisement page is up, the user could press a designated button to take advantage of the offer and get connected directly to the advertiser by voice. An optional promotional code placed in the ad could guarantee to the vendor that the response is a result of the mobile advertising program. Another option is to have the mobile dial a phone number dedicated by the vendor to the mobile advertising program. The phone number to be automatically dialed is integral to the information page and would change automatically for each different advertiser.

Several variations can exist in the user interface for such a pre-loaded information display. The display could simply rotate as a screen saver program from page to page when the phone is un-used for any other purpose. The user could also be required to push a key to begin the page rotation.

In any case, the invention provides a very fast and easy method to give the user most commonly wanted information, while creating a new means of advertising and order gathering.

Finally, the information and advertisements that are sent to the mobile device would be location sensitive. In essence, the information that is pushed to the user can change, depending on which base station the mobile is currently registered to, or the geographical location as determined by geo-location methods commonly used in mobile phones. Thus, the advertisements can become very finely granulated by neighborhood for local shops and the news and weather likewise can become very locally oriented.

In the preferred embodiment of this invention the user device stores these relevant pages and the wireless network need only transmit such pages occasionally. This reduces network transmission overhead. The network can transmit the pages or updated pages when there is unused bandwidth. Page updates can cease when the network needs all the bandwidth resources for voice or data sessions.

In a TDMA (Time Domain Multiple Access) scheme for instance, user timeslots can be used, or unused, depending on network loading. Unused timeslots can be temporarily assigned to information page transmissions until the timeslots are needed for user access. A typical TDMA scheme as used by xMac, a proprietary MAC layer used by xG Technology, Inc. is shown in FIG. (1) but as is well known by those skilled in the art, other MAC layer schemes exist that can be adapted to the intent of this disclosure.

Since certain changes may be made in the above described mobile handset information system and method without departing from the scope of the invention herein involved, it is intended that all matter contained in the description thereof or shown in the accompanying figures shall be interpreted as illustrative and not in a limiting sense.

What is claimed is:

1. A method for transmitting pre-formatted information containing displays such as advertising, news, and weather to mobile handsets for display on the mobile handset's display screen allowing real time viewing of useful information to all users simultaneously without requiring any user input, any connection to the Internet, or any user interaction using a web browser with web pages comprising:

transmitting a radio frequency signal from a base station to all mobile handsets in said base station's range wherein said radio frequency signal has a mobile access control protocol containing superframes and said superframes containing data packet and voice packet information transmission periods;

said mobile access control protocol that is transmitted to said mobile handsets having a pre-formatted information transmission period in addition to said data packet and voice packet information transmission periods within said superframes dedicated for pre-formatted information containing one or more displays of information;

said mobile handsets receiving the pre-formatted information containing one or more displays of information and automatically storing and displaying said one or more displays of information on said mobile handset's display screen while said mobile handsets are inactive, not connected to the Internet or using a web browser, and without requiring any user input; and, using a Time Domain Multiple Access scheme wherein unused timeslots in said mobile access protocol superframes can be temporarily assigned to displays of information transmissions until said unused timeslots are needed for user access.

2. The method of claim 1 wherein said pre-formatted information contains displays of information pertaining to localized information and said radio frequency signal is transmitted by said base stations in the localized area only to users in the localized area.

3. The method of claim 1 wherein said mobile handsets store said displays of information and said base stations only transmit such displays occasionally when there is unused bandwidth and said displays of information transmissions can cease when said base stations need all the bandwidth for voice or data sessions.

4. The method of claim 1 wherein said mobile handset's display screen display rotates said displays of information as a screen saver program when said mobile handsets un-used for any other purpose.

5. The method of claim 1 wherein users of said mobile handsets are required to push a key to begin viewing said displays of information.

* * * * *